United States Patent [19]

Kenda

[11] Patent Number: 5,547,311
[45] Date of Patent: Aug. 20, 1996

[54] CATHODIC PROTECTION, LEAK DETECTION, AND THERMAL REMEDIATION SYSTEM

[76] Inventor: William P. Kenda, 17119 Kettle Creek Dr., Spring, Tex. 77379

[21] Appl. No.: 130,622

[22] Filed: Oct. 1, 1993

[51] Int. Cl.$^6$ .................................................. E02B 13/00
[52] U.S. Cl. .......................... 405/52; 204/196; 405/128; 405/159
[58] Field of Search ...................... 405/128, 129, 405/154, 184, 157, 43, 45; 204/196, 147

[56] References Cited

U.S. PATENT DOCUMENTS

| | | | |
|---|---|---|---|
| 3,458,643 | 7/1969 | Dorr | 174/6 |
| 4,170,532 | 10/1979 | Tatum | 204/196 |
| 4,400,259 | 8/1983 | Schutt | 204/196 |
| 4,544,464 | 10/1985 | Bianchi et al. | 204/147 |
| 4,919,201 | 4/1990 | Bridges et al. | 166/60 |
| 5,026,508 | 6/1991 | Tatum, Jr. et al. | 252/502 |
| 5,074,366 | 12/1991 | Karlsson et al. | 175/76 |
| 5,080,773 | 1/1992 | Tatum, Jr. et al. | 204/196 |
| 5,209,605 | 5/1993 | Cherrington | 405/184 |
| 5,340,238 | 8/1994 | Tuma | 405/128 X |
| 5,387,057 | 2/1995 | Deloach | 405/128 |

OTHER PUBLICATIONS

Corrocon, Inc.; Bottom Logic UnderTank Systems; *Retrofit Upgrades for In–Service Tanks;* (4 pp.).
Corrocon, Inc.; Bottom Logic UnderTank Systems Technical Literature, Dec. 1992; (18 pp.).
Pollution Engineering, *Aboveground Storage Tank Regulations;* Apr. 15, 1993, Wayne Geyer; (pp. 42–44).
Aboveground Storage Tank Guide; David H. Kroon and Michael Urbas; Jul. 1992; (Tab 200, pp. 15–21) (Tab 100, pp. 57–59) (Tab 200, pp. 75–76) (Tab 300, pp. 15–22) (Tab 300, pp. 63–66) (Tab 300, pp. 103–108) (Tab 300 pp. 445–454) (Tab 300, pp. 573–574).

*Primary Examiner*—Dennis L. Taylor
*Attorney, Agent, or Firm*—Conley, Rose & Tayon, P.C.

[57] ABSTRACT

A system for cathodically protecting a structure that is in contact with soil and for extracting vapor or liquid from the soil, comprising a porous conducting material in direct contact with the soil, a power source being connected to the structure, a tubing string including a central tubing passage, at least one anode electrically connected to the positive terminal of said power source and having a bore therethrough, said bore being aligned with said tubing passage, at least one screen section comprising a hollow member having perforations therethrough and end openings, said end openings being aligned with said tubing passage, said tubing string, said screen and said anode being surrounded and supported by said conducting material such that current provided by said power source flows through said lead to said anode, and from said anode through conducting material and soil into the structure, said tubing string, said screen and said anode being aligned and connected such that vapor or liquid present within the soil can enter the system through said screen section and be drawn out of said tubing passage, said porous conducting material filtering the vapor or liquid to remove solid particles therefrom before the vapor or liquid enters said screen. In a second embodiment, the system is provided with means that allow it to function as a source of heat, providing thermal soil remediation capability.

18 Claims, 4 Drawing Sheets

CATHODIC PROTECTION, LEAK DETECTION, AND THERMAL REMEDIATION SYSTEM

TECHNICAL FIELD OF THE INVENTION

The present invention relates to equipment for the protection of liquid storage tanks from corrosion, for detection of leakage from such tanks and for the remediation of such leakage. More particularly, the present invention relates to a string of equipment placed in the soil beneath a tank for causing electrical current to flow through the soil and the tank, as well as detecting contamination of the soil and for supplying thermal energy to the soil beneath the tank.

BACKGROUND OF THE INVENTION

It is common for various liquid chemicals, including petroleum products and by-products, to be stored in large metal tanks. These tanks are typically located at or somewhat below ground level, with their lower portions in contact with the earth. Because the metal tanks have a tendency to corrode and thus leak, it is desirable to provide means for preventing such corrosion. One common corrosion-preventing means involves altering the relative electrical potential of the tank material, so that corrosion does not occur.

This can be achieved either by connecting so-called sacrificial anodes to the tank or by including the tank in an impressed-current circuit. Sacrificial anodes are made of a metal having a higher galvanic potential than the tank metal, thereby causing a flow of current into the tank metal, at the expense of the anode, which is "sacrificed" for this purpose. In contrast, impressed-current circuits require that an external source of electrical potential be provided to drive a current through the tank metal. The anode in such a circuit merely completes the circuit between the power source and the tank/cathode. In general, cathodic protection of metal objects such as tanks and pipelines is well-known.

Another desired aspect of liquid storage is the ability to detect leaks from such tanks. It is possible for a leak to occur that is too small to be detected by conventional tracking methods used to determine loss of inventory from the tank. Even such a small leak, however, can pose a significant environmental threat, particularly if it occurs in the vicinity of a groundwater recharge zone. Spills may also contaminate the soil around a tank. The recent expansion of environmental regulations has increased the economic incentive for preventing and remediating any contamination of the soil that may occur.

Once a chemical contaminant is present in the soil, the site may be remediated in any of several ways. The contaminated soil may be completely removed and either cleaned or dumped in an appropriately constructed landfill. This method is costly and also requires removal of any structures that might be supported by the soil. Alternatively, the soil may be cleaned in situ. The contaminant may be vacuumed or washed from the soil by several methods. If vacuum extraction of the contaminant is performed, it may be advantageous to raise the temperature of the soil near the contamination, in order to decrease the viscosity, and increase the vapor pressure and volatility of the contaminant, and thereby improve the flow of the contaminant into the vacuum system. Elevation of the soil temperature is also advantageous in situations where bioremediation is used, either alone or in conjunction with vacuum extraction, as the microorganisms that consume the contaminant are typically more effective at temperatures above ambient.

Thus, it is desired to provide a system of equipment that has cathodic protection, leak detection, vacuum extraction, and thermal elevation capabilities. It is further desired that said system be relatively inexpensive and simple to install. Finally, it is desired that the system be installable on existing tanks and other equipment without interrupting the operation of such tanks or other equipment. The system of the present invention provides all of these capabilities.

SUMMARY OF THE PRESENT INVENTION

The present invention comprises a pipe string, preferably embedded in a granular packing material in a horizontally drilled borehole beneath the structure to be protected. The string provides a clear passage out of the well. Adjacent the remote end of the string are a plurality of anodes and screen sections, which are aligned with the string passage. The anodes are wired at least one electrical power source to provide either an open circuit into the soil, which is completed by the structure to be cathodically protected, or to function as resistance heaters, by means of a closed circuit passing through said anodes. The lead wires to the anodes extend through the centers of said anodes and said screens and through said tubing passage to the surface, where they are preferably connected, respectively, to a rectifier and a high voltage power source. Vapor and liquid that are present in the soil can migrate through said screens and into said tubing passage. Thus the present system operates as a cathodic protection system, a soil contamination monitoring system (for leak detection), a vacuum extraction system and a thermal remediation system. The present system does not necessitate the removal of structures that may be founded on the contaminated soil. Because of its ability to warm the soil, the present system is also useful for activating microorganisms for the bioremediation of the soil under large structures.

BRIEF DESCRIPTION OF THE DRAWINGS

For a detailed description of a preferred embodiment of the invention, reference will now be made to the accompanying drawings wherein.

DETAILED DESCRIPTION OF THE INVENTION

Figure 1:
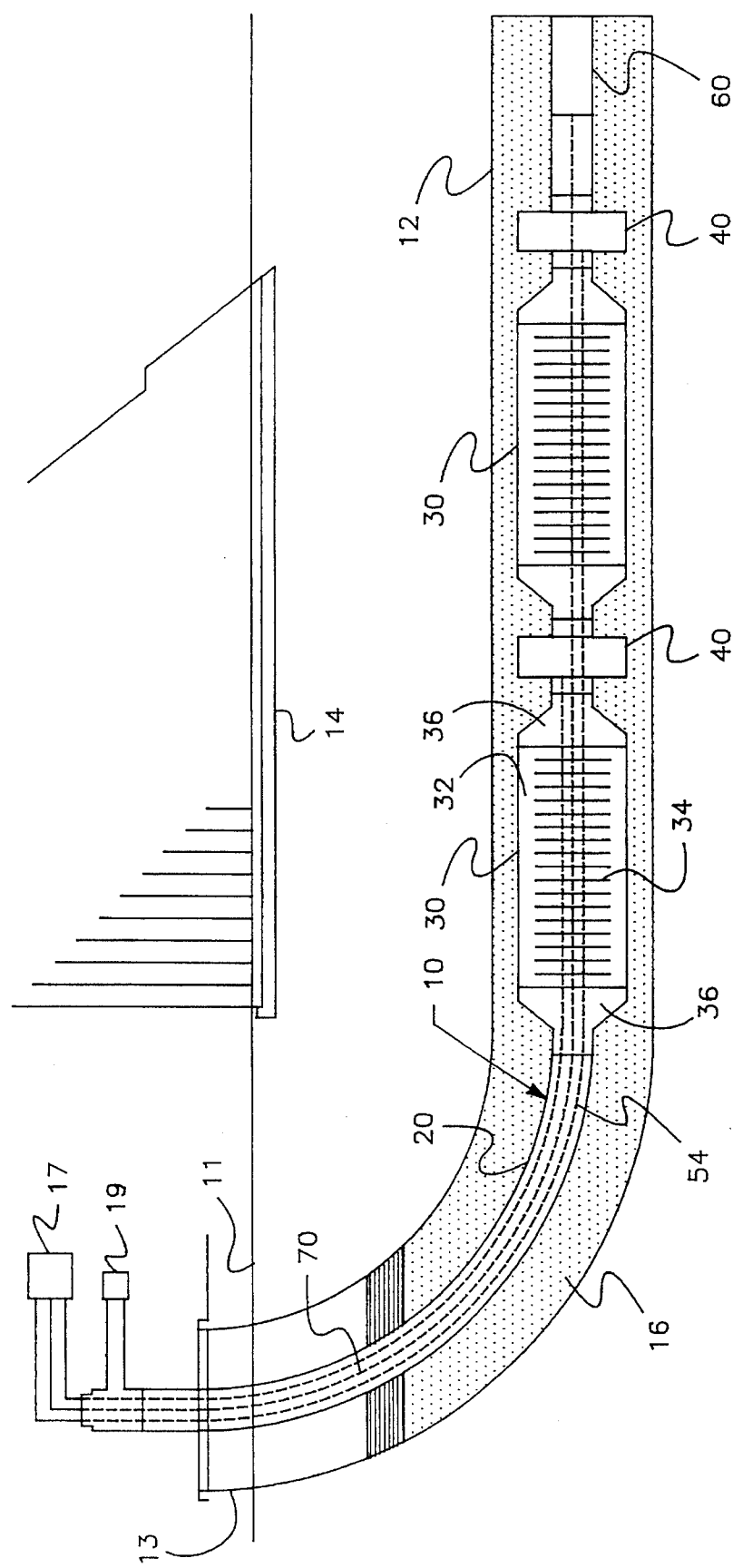
FIG. 1 is a cross-sectional schematic drawing of the system of the present invention.

Referring initially to FIG. 1, the system of the present invention preferably comprises a pipe string 10 positioned in a horizontal borehole 12 beneath a metal object 14. In FIG. 1 metal object 14 is an on-ground storage tank. Pipe string 10 is supported in borehole 12 by a bed of electrically conducting material 16. It will be understood that string 10 of the present invention need not be horizontal and may be positioned anywhere in the soil relative to the metal object which is to be protected, with the preferred distance between string 10 and object 14 being between 2 and 20 feet. It is preferred but not necessary that string 10 be positioned above the water table.

According to a preferred embodiment, string 10 and conducting material 16 are installed by the following method, which permits several advantages, as set forth in detail below. Preferably, horizontal borehole 12 is drilled from the surface of the ground near the desired location of the cathodic protection system. Conventional horizontal drilling techniques are used. Once the horizontal well has attained the desired diameter, depth and horizontal length, the drilling equipment is removed, and string 10 is placed in a carrier casing (not shown) and run down the well, as disclosed in U.S. Pat. No. 5,209,605 to Cherrington (the '605 patent), which is fully incorporated herein by reference. With string 10 in place, a known gravel packing technique, such as is disclosed in the '605 patent, is washed down the carrier casing and used to fill the annulus between pipe string 10 and borehole 12 with electrically conducting material 16. As disclosed in the '605 patent to Cherrington, stabilizing fins on the outside of the carrier casing act to center the carrier casing, and thus also string 10, within the borehole. As conducting material 16 is packed into borehole 12, the carrier casing is backed out of the well, leaving string 10 closely surrounded by and supported in a packed bed of conducting material 16, which is in turn in direct contact with the soil forming borehole 12. Preferably, conducting material 16 comprises granular petroleum coke breeze, or a similar conducting granular substance.

Because the casing and string used in the preferred embodiment are relatively stiff, it is desirable to maximize the radius of curvature of borehole 12. For the same reason, the upper end 13 of borehole 12 may enter the earth at an angle. Conventional drilling techniques are sufficiently advanced to enable easy placement of string 10 according to the above method. It will be understood that variations on the above method can be used to install the present system, provided they result in a gravel-packed string. For example borehole 12 could be lined with a conventional casing, which is removed from the borehole as pipe string 10 is packed into it.

Figure 2:
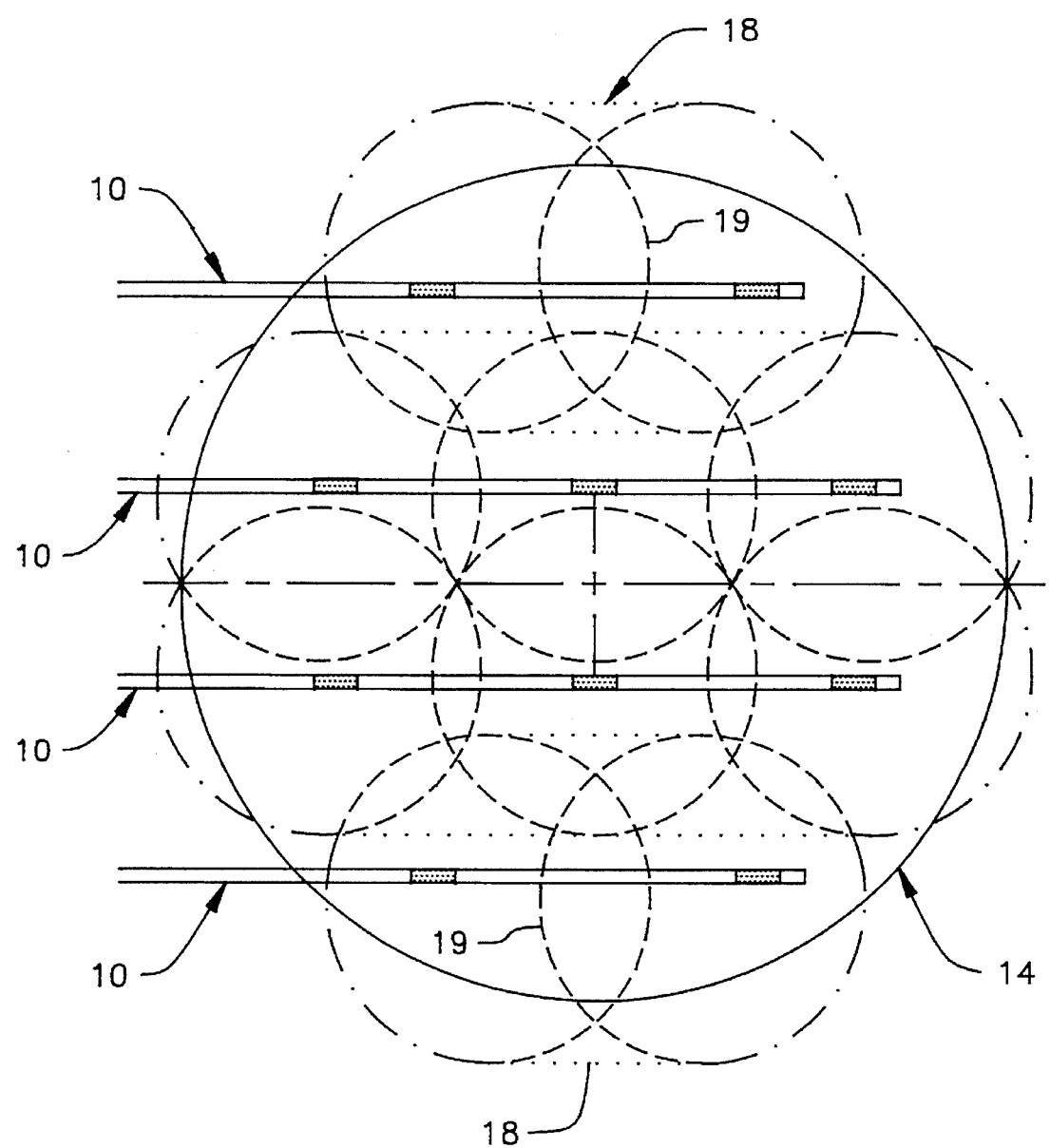
FIG. 2 is a plan schematic view of the present system installed beneath a tank.

As shown in FIG. 2, when it is desired to protect a large, circular tank by means of the present system, an array of multiple strings 10 may be placed under tank 14 to provide optimal coverage. Strings 10 may be placed in any one of several patterns, including substantially parallel, as shown, or radiating from one or more circumferential points around the tank. In any case, the boreholes are preferably made sequentially, so that a single drilling rig may be used to drill all of the desired boreholes, with the rig being moved as necessary.

Still referring to FIG. 2, each string 10 forms an oblong zone of leak detecting effectiveness 18 (indicated by dotted lines) and a plurality of circular zones of cathodic effectiveness 19 (indicated by dashed lines). Both zones 18 and 19 are influenced by soil composition, moisture content, porosity, compaction, conductivity, and other variables. Hence, the optimal number and arrangement of strings 10 may be determined based on the characteristics of the particular site and the size and shape of object 14.

Referring again to FIG. 1, pipe string 10 comprises a length of tubing 20, one or more screens 30, one or more anode sections 40, and a terminal element 60. Preferably, tubing 20 extends from the well opening 13 at the ground surface to the zone that is desired to be protected. In FIG. 1, the protected zone is directly beneath tank 14. Within protected zone, it is preferred that screens 30 and anode sections 40 alternate along the balance of the length of pipe string 10 between tubing 20 and terminal element 60. Any other suitable arrangement of screens and anodes may be used.

According to a preferred embodiment, screens 30 are cylindrical and have a diameter greater than or equal to the diameter of tubing 20. Each screen 30 has an interior space 32 and a plurality of circumferential slots 34 therethrough, which allow for the passage of vapors and fluid into interior space 32. Slots 34 are preferably spaced along the longitudinal length of screens 30 and have a maximum width of approximately 0.01 to 0.02 inches, so that the conducting material 16 is prevented from entering screens 30. Thus, slots 34 are sized in accordance with the size of the granules of conducting material 16. Alternatively, screens 30 may include any type of opening, such as longitudinal slots, perforations or the like, or may be constructed of sturdy wire mesh, so long as each screen 30 is capable of supporting the compressive load to which string 10 is subjected and allows the flow of vapors and liquid therethrough. Screen 30 further includes end connections 36, which close the cylindrical screen and taper to a reduced diameter equal to that of tubing 20. End connections 36 may be separate or integral and include a bore therethrough, which communicates with interior space 32 and the bore through tubing 20. Screens 30 are preferably coaxially aligned with and connected to tubing 20.

Figure 3:
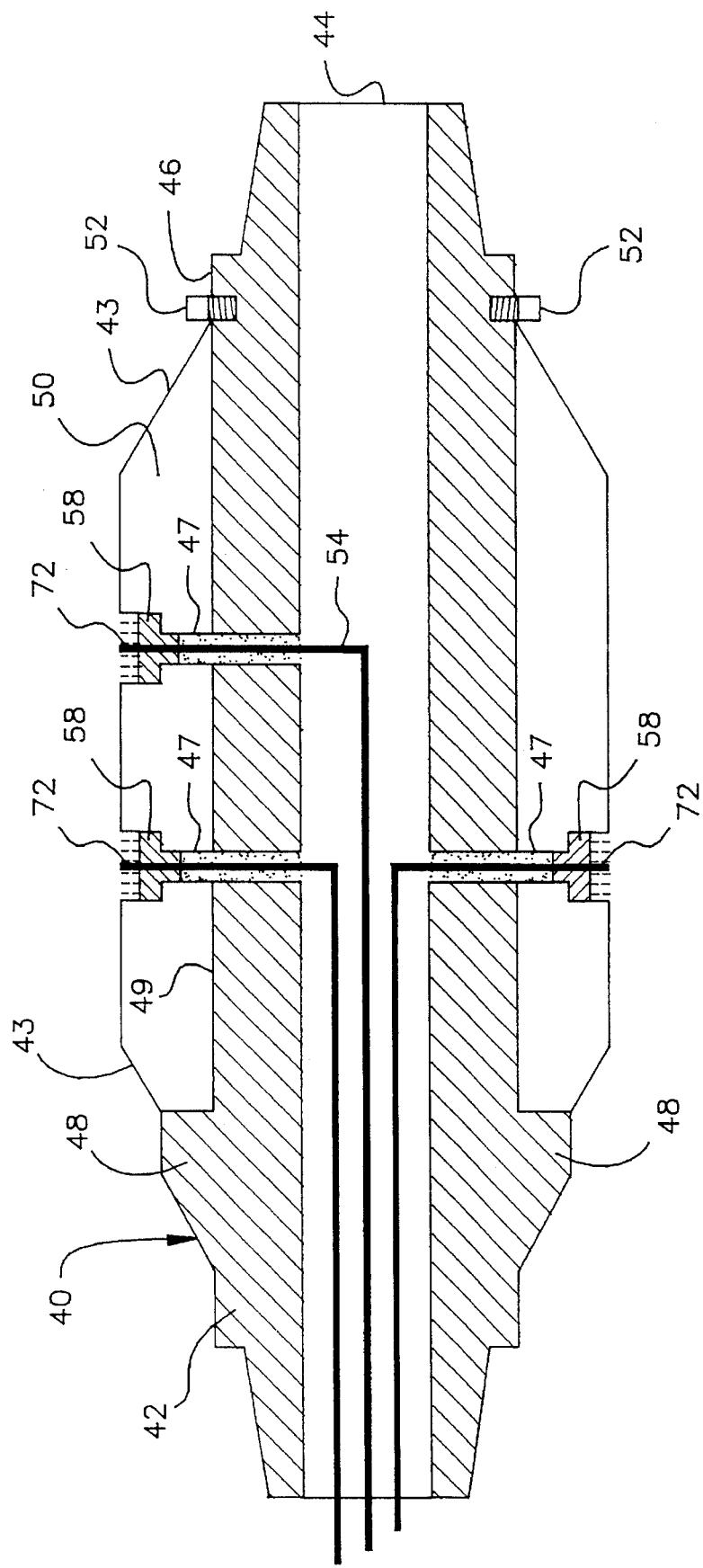
FIG. 3 is a cross-sectional elevation of an anode section such as may be used in the system of FIG. 1.

Referring now to FIGS. 1 and 3, anode sections are disposed adjacent the end connections 36 of screens 30. Anode sections 40 are preferably annular and are connected exteriorally and coaxially to screens 30. Each anode section 40 comprises a base 42 having a central bore 44 therethrough and an outer annular surface 46 upon which an anode 50 is supported. Anode 50 is preferably elongated and annular. Bore 44 is aligned with the bores of end connections 36 of adjacent screens 30 such that a continuous passage 70 extends from the wellhead to terminal element 60. Base 42 includes at least one radial passage 47, which communicates between bore 44 and outer surface 46. Outer surface 46 preferably includes an annular shoulder 48 and a seating surface 49. According to a preferred embodiment, anode 50 is annular and has a substantially trapezoidal cross section. The trapezoidal cross-section provides tapered ramp surfaces 43, which facilitate installation and removal of the string, as they avoid angular shapes that might otherwise snag on or "plough" into the wall of borehole 12. Anode 50 is slidingly received over seating surface 49 and may be held in position against shoulder 48 by set screws 52, or any other suitable means.

To form an electrical connection so as to pass an electrical current through the anode, an electrical lead 54 passed radially inwards through passage 47 and through the central bore 44 of anode section 40, and extends through passage 70 to the ground surface. Remote end 56 of lead 54 is preferably embedded in a conductive filler 58 within radial passage 47, which forms the electrical contact between lead 54 and anode 50. From bore 44, lead 54 extends from the periphery of anode 50, through the central bores of adjacent screens and anode sections and through tubing 20 to a power source at the surface 11.

According to a preferred embodiment, the present system is also capable of functioning as a soil heat source. As shown in detail in FIG. 3, each anode 50 further includes a pair of secondary leads 72, 74, which provide a closed circuit through anode 50. Leads 72, 74 preferably are each electrically connected to anode 50 in the same manner as lead 54, discussed above. Leads 72, 74 are connected to an AC power source in an electrical panel 17 at the surface, such that when power is supplied across leads 72, 74, anode 50 functions as a resistance heater, heating the temperature of the surrounding conducting material 16, and thus the soil. The thermal conductivity of the soil, as well as the number and proximity of the resistance heaters will affect the maximum temperature to which the heaters must be heated to achieve the desired increase in soil temperature.

Figure 4:
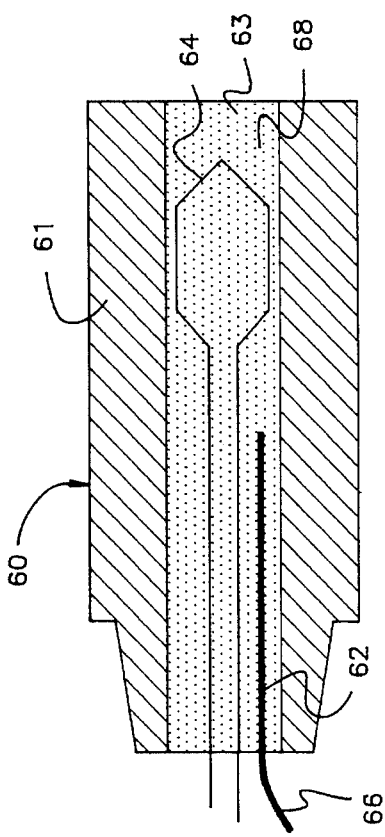
FIG. 4 is a cross-sectional elevation of a terminal unit such as may be used in the system of FIG. 1.

Referring now to FIGS. 1 and 4, terminal element 60 preferably comprises an annular body 61 having a bore 63 therethrough. Terminal element 60 is preferably coaxially aligned with and connected to the remote end of pipe string 10. Housed within bore 63 is a reference anode 62, capable of measuring the potential between anodes 50 and the surrounding soil. Like anodes 50, reference anode 62 is also connected to the wellhead 15 by means of a lead wire 66 extending to the surface 11 through passage 70. Also housed in bore 63 is a thermocouple 64 or other temperature-sensing means. In a preferred embodiment, anode 62 and thermocouple 64 are embedded in a conducting material 68 within bore 63 so that anode 62 is in electrical contact with the soil and thermocouple 64 is in thermal contact with the soil. Measurements from anode 62 allow the tank-to-soil potential to be monitored, while measurements from thermocouple 64 allow the temperature of the soil in the vicinity of the terminal element 60 to be monitored. Thermocouple 64 can be any conventional thermocouple designed to operate within the operating range of the system.

Referring now to FIGS. 1, 3 and 4, in operation, the system described above is normally operated as a cathodic protection system by connecting lead wires 54 from anodes 50 to a DC power source in the electrical panel 17 at the surface, and connecting reference anode 62 to a volt/amp meter, also in panel 17. The DC power source is preferably a rectifier. Anodes 50 are connected to the positive side of the rectifier, while tank 14 is connected to the negative side of the rectifier, forming a cathodic protection circuit. When power is supplied to the system, current flows from the rectifier, through leads 54, anodes 50, and conducting material 16 and into the soil. The cathodic protection circuit is completed by the flow of current from the soil into tank 14 and thence into the rectifier, thus providing impressed-current cathodic protection to tank 14. Reference anode 62 is in electrical contact with the soil and provides a measurement of the tank to soil potential. By monitoring the readings from reference anode 62, it is possible to ensure that adequate current is maintained through the system to protect tank 14.

The present system further includes vacuum means for lowering the pressure within passage 70, such that any vapors or liquid present in the soil migrate from the soil through the openings in screens 30 into passage 70 and thence to the surface. Such means may consist of a vacuum pump at the surface connected to passage 70. Conducting material 16 acts as a filter medium for vapor or liquid migrating from the soil into screens 30. Additional equipment 19, well known in the art, is preferably provided at the surface 11, to receive and analyze these substances. Such monitoring may be continuous, or may be carried out intermittently. Thus, even a small leak or spill that allows a contaminant to enter the ground will be detected as a result of migration of the contaminant into the present system. If the contaminant is undetectable alone, or if background levels of contamination already exist in the soil, conventional chemical tracers can effectively be used to detect a leak via the present monitoring system. When the presence of a contaminant is detected in the vapors or liquids exiting tubing 20, it may become necessary or desired to clean up the contaminated soil by removing contaminant therefrom. In such a case, the system of the present invention can advantageously be used to provide remediation capability.

First, if the contaminant is sufficiently volatile, it may be completely removed from the soil by vacuum extraction. The pressure differential in passage 70 may be increased, in order to draw the contaminant vapors into screens 30. They can then be drawn out of the system and either treated or properly disposed of.

Alternatively, it may be desired to warm the contaminant plume, in order to decrease its viscosity and increase its vapor pressure, thereby improving vacuum extraction. Warming of the contaminant plume can also result in thermal destruction of some contaminants. To operate the system as a heat source, it is contemplated, but not necessary, that the cathodic protection circuit be shut down. It will be understood that, in some circumstances, the cathodic protection circuit may be omitted entirely, leaving a system capable of providing vacuum extraction and thermal remediation abilities only. Such a system might find use in sites that contain no structures, but are nevertheless contaminated. When the system is operating as a heat source, the temperature of the individual components of string 10, and of anodes/resistance heaters 50 in particular, may go as high as 200°–500° F., depending on the limitations of the system. In general it is not necessary to heat a contaminant above its flash point, and most such thermal remediation is carried at approximately 100°–250° F.

Screens 30 and anode bases 42 are preferably constructed of metal, such as steel. If the temperatures to which string 10 will be subjected are not too high, screens 30 and anode bases 42 can alternatively be constructed of high density polyethylene (HDPE), which has a melting point of 275° F., or the like. Where applicable, HDPE is preferred over steel because it is flexible, durable, and is not degraded by most of the substances that might be encountered in the present application. It is also significantly less expensive than steel. Other suitable materials include various composite materials, such as are well known in the art. Anode 50 is preferably constructed from a titanium mixed metal oxide, silicon iron, or graphite. Because it is better suited for the present application than the first two compounds, graphite is the preferred material for anode 50 where the anode is to be operated as a thermal remediation system.

According to a second preferred embodiment, a contaminant plume may be bioremediated by treatment with microorganisms, which digest the contaminant, converting it into nonhazardous by-products. Such microorganisms typically are more effective at temperatures slightly above ambient, in the range of 90°–150° F., so the present system is advantageous in this embodiment. Bioremediation may utilize microorganisms already present in the soil, or may rely upon special microorganisms developed and introduced for the remediation of a particular contaminant. Many such microorganisms are known, as are methods for achieving optimal bioremediation results. When the pressure in passage 70 is lowered, the flow of oxygen-containing air through the soil is increased, which improves bioremediation. Also, because of its permeability, the present system can also be used to inject nutrients, oxygen, or other bioremediation enhancers into the soil via string 10.

Figure 5:
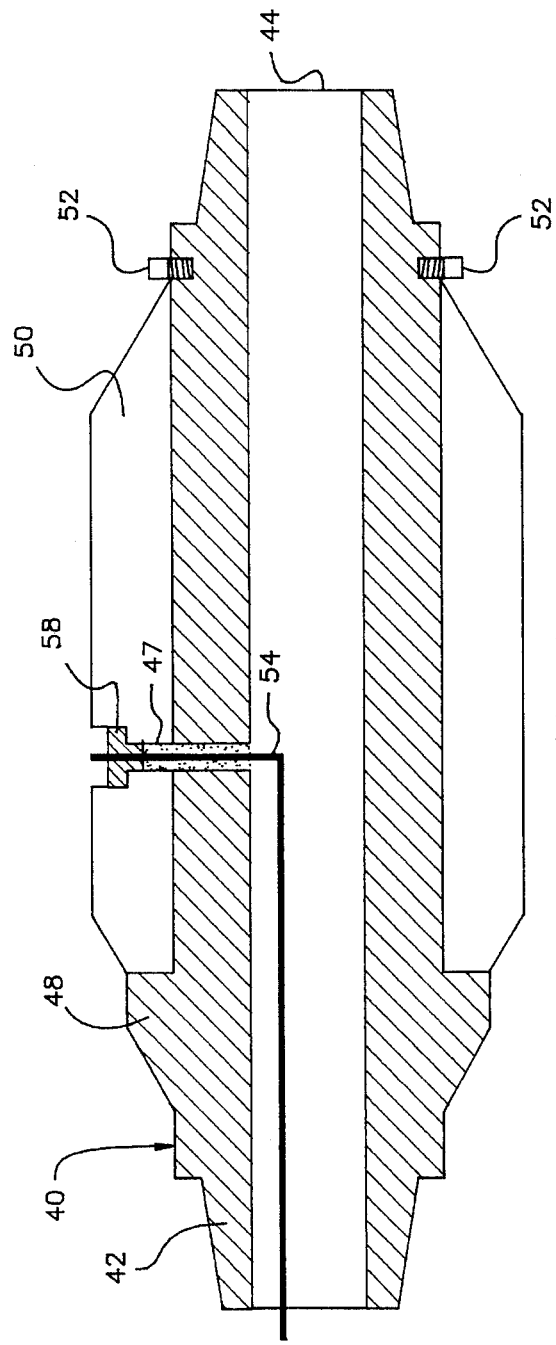
FIG. 5 is a cross-sectional elevation of a second embodiment of an anode section.

It will be understood that the thermal remediation capability may be omitted from the present system. In such a case, the preferred anode section 40 is that shown in FIG. 5. In FIG. 5, leads 72, 74 are omitted and only lead 54 is connected to anode 50. Anode 50 functions in the same manner as anode 50 of FIG. 3 described above. In still another embodiment, leads 72, 74, which provide the system with its resistance heating circuit, may be embedded in a separate heating element, instead of in anode 50. In this embodiment, the heating element or elements would be coaxially aligned with and connected to the other elements of string 10, in the manner described above.

It will further be understood that not all of the vapor or liquid entering the pipe string 10 flows through every screen and every anode. For example, little or no vapor or liquid will flow through the equipment at the remote end of the string. If the vapor or liquid is entering from a localized region, only that portion of string 10 that is uphole from that region will experience flow therethrough. Furthermore, if the order of the screens and anodes is altered, or if the terminal element is omitted from the system, there may be one or more anodes through which no vapor or liquid flows.

While the preferred embodiments of the present invention have been disclosed and described, it will be understood that various aspects of the system may be modified without departing from the spirit of the invention.

What is claimed is:

1. A system for cathodically protecting a structure that is in contact with soil and for extracting vapor or liquid from the soil, comprising:

a porous electrically conducting material in direct contact with the soil;

a power source having positive and negative terminals, said negative terminal being electrically connected to the structure;

a tubing string having a central passage;

at least one anode electrically connected to the positive terminal of said power source;

at least one screen member having perforations therethrough;

each of said anodes and said screens being a separate piece of equipment and aligned axially with said tubing string;

said tubing string, said screen and said anode being surrounded and supported by said conducting material such that current provided by said power source flows into said anode, through said conducting material and soil, to the structure; and said tubing string, said anode and said screen having a common passage therethrough for allowing the vapor or liquid present in the soil to flow to the surface;

the system being positioned in a substantially horizontal well under the structure.

2. The system according to claim 1 further including means for passing an electrical current through said anode and causing said anode to function as a resistance heater.

3. The system according to claim 1 wherein said anode is disposed exterior to said screen.

4. The system according to claim 1 wherein at least a portion of the vapor or liquid extracted from the soil passes through said anode.

5. The system according to claim 1 wherein said conducting material is packed around said screen by gravel-packing techniques.

6. The system according to claim 1 wherein said anode is supported on a base.

7. The system according to claim 1 wherein said anode has a trapezoidal cross-section.

8. The system according to claim 1 wherein the system is placed in a borehole horizontally drilled beneath the structure.

9. The system according to claim 1 wherein said power source and said anode are electrically connected by a lead extending through said tubing passage.

10. The system according to claim 1, further including means for removing samples of vapor or liquid from the soil via said passage and means for evaluating said samples for the purpose of detecting contamination of the soil.

11. A system for cathodically protecting a structure that is in contact with soil and thermally remediating the soil, comprising:

a porous electrically conducting material in direct contact with the soil;

a first power source;

a second power source having positive and negative terminals, said negative terminal being connected to the structure;

a tubing string having a passage therethrough;

at least one heating means electrically connected to said first power source for passing a current through said heating means and causing said heating means to function as a heater;

at least one anode electrically connected to said positive terminal;

said tubing string, said heating means and said anode being surrounded and supported by said conducting material such that current provided by said second power source flows through said anode, through said conducting material and soil to the structure.

12. The system of claim 11 wherein said heating means and said anode comprise a single unit.

13. The system of claim 11, further including at least one screen member having perforations therethrough, said perforations being sized to prevent passage of said conducting material therethrough, said tubing string and said screen forming a passage to the surface such that vapor or liquid present in the soil can drawn to the surface through said passage.

14. The system of claim 13 wherein and said porous conducting material filters the vapor or liquid extracted from the soil to remove any solid particles therefrom before the vapor or liquid enters said screen.

15. A system for thermally remediating soil and for detecting vapor or liquid in the soil, comprising:

a first power source;

a tubing string having a passage therethrough;

at least one heating means electrically connected to said first power source for passing a current through said heating means and causing said heating means to function as a heater;

at least one screen member having perforations therethrough; and said tubing string, said screen member and said heating means forming a passage to the surface such that vapor or liquid present in the soil can drawn to the surface through said passage.

16. The system according to claim 15, further including:

a porous, electrically conducting material in direct contact with the soil;

a second power source having positive and negative terminals, said negative terminal being connected to the structure;

at least one anode electrically connected to said positive terminal;

said tubing string, said screen and said anode being surrounded and supported by said conducting material such that current provided by said second power source flows through said anode, through said conducting material and soil to the structure.

17. The system according to claim 1, further including a plurality of anodes and a plurality of screens.

18. A system for cathodically protecting a structure that is in contact with soil and for extracting vapor or liquid from the soil, comprising:

a porous electrically conducting material in direct contact with the soil;

a power source having positive and negative terminals, said negative terminal being electrically connected to the structure;

a tubing string having a central passage;

at least one anode electrically connected to said positive terminal of said power source;

at least one screen member having perforations therethrough, said anode and said screen being separate pieces of equipment and said anode being outside of said screen;

said tubing string, said screen and said anode being surrounded and supported by said conducting material such that current provided by said power source flows into said anode, through said conducting material and soil, to the structure; and said tubing string, said screen and said anode forming a hollow passage therethrough for allowing the vapor or liquid present in the soil to flow to the surface;

means for passing an electrical current through said anode and causing said anode to function as a resistance heater.

* * * * *